United States Patent
Gartner et al.

(10) Patent No.: US 10,562,133 B2
(45) Date of Patent: Feb. 18, 2020

(54) METHOD FOR A ROBOT-ASSISTED ASSEMBLY OF A SUPPORTING STRUCTURE FOR A PASSENGER TRANSPORT SYSTEM

(71) Applicant: INVENTIO AG, Hergiswil (CH)

(72) Inventors: Manfred Gartner, Felixdorf (AT); Richard Schütz, Vienna (AT); Thomas Koukal, Absam (AT)

(73) Assignee: INVENTIO AG, Hergiswil (CH)

( * ) Notice: Subject to any disclaimer, the term of this patent is extended or adjusted under 35 U.S.C. 154(b) by 22 days.

(21) Appl. No.: 16/083,830

(22) PCT Filed: Mar. 6, 2017

(86) PCT No.: PCT/EP2017/055168
§ 371 (c)(1),
(2) Date: Sep. 10, 2018

(87) PCT Pub. No.: WO2017/153324
PCT Pub. Date: Sep. 14, 2017

(65) Prior Publication Data
US 2019/0134753 A1 May 9, 2019

(30) Foreign Application Priority Data
Mar. 10, 2016 (EP) .................................. 16159642

(51) Int. Cl.
*B23K 31/02* (2006.01)
*B66B 23/00* (2006.01)

(52) U.S. Cl.
CPC .............. *B23K 31/02* (2013.01); *B66B 23/00* (2013.01)

(58) Field of Classification Search
CPC .......... B66B 23/00; B23K 31/02; B23K 31/00
(Continued)

(56) References Cited

U.S. PATENT DOCUMENTS

| 4,811,829 A * | 3/1989 | Nakazawa | B66B 23/00 198/326 |
| 4,832,169 A * | 5/1989 | Goto | B65G 21/02 198/326 |

(Continued)

FOREIGN PATENT DOCUMENTS

| CN | 1507410 A | 6/2004 |
| CN | 201333595 | 10/2009 |

(Continued)

OTHER PUBLICATIONS

Database WPI Week 200977, Thomson Scientific, London, GB; AN 2009-R26074, XP002760800.
(Continued)

*Primary Examiner* — James R Bidwell
(74) *Attorney, Agent, or Firm* — Knobbe Martens Olson & Bear LLP

(57) ABSTRACT

What is described is a method for producing a framework-like supporting structure for a passenger transport system, such as a moving staircase, in which an entire production sequence is divided into at least three separate joining steps which can be performed by coordinated semi- or fully automated joining stations that cooperate with each other. Each of the joining stations comprises at least one retention device and at least one welding robot, as well as optionally at least one handling robot. The joining steps to be performed in the individual joining stations are configured so that interim products can be produced efficiently and harmonized with a subsequent joining step in a subsequent joining station. Interim products can be forwarded sequentially and at optimized, short intervals from joining station to joining station, to be able to provide a finished, load-bearing supporting structure at the end of the sequence.

13 Claims, 10 Drawing Sheets

(58) Field of Classification Search
USPC ............................ 198/326, 321, 860.1, 860.2
See application file for complete search history.

(56) References Cited

U.S. PATENT DOCUMENTS

| | | | | |
|---|---|---|---|---|
| 7,703,594 | B2* | 4/2010 | Stein | ........................ B66B 23/00 198/321 |
| 8,011,682 | B2* | 9/2011 | Klein | ...................... B66B 31/00 198/326 |
| 2002/0175039 | A1* | 11/2002 | Fargo | ...................... B66B 23/00 198/321 |
| 2003/0116402 | A1* | 6/2003 | Krampl | ................... B66B 23/00 198/321 |
| 2007/0216133 | A1 | 9/2007 | Klein et al. | |
| 2016/0376128 | A1* | 12/2016 | Gonzalez Pantiga | ... B66B 23/00 198/321 |

FOREIGN PATENT DOCUMENTS

| | | |
|---|---|---|
| CN | 201942404 U | 8/2011 |
| CN | 103917476 A | 7/2014 |
| CN | 203804432 | 9/2014 |
| EP | 1 795 487 B1 | 2/2010 |
| EP | 1 795 488 B1 | 4/2010 |
| EP | 1 795 489 B1 | 9/2010 |
| EP | 2511441 A1 | 10/2014 |
| WO | WO 2011/073708 A1 | 6/2011 |

OTHER PUBLICATIONS

Database WPI Week 201479, Thomson Scientific, London, GB; AN 2014-V41280, XP002760801.
International Search Report for International Application No. PCT/EP2017/055168 dated May 30, 2017.

* cited by examiner

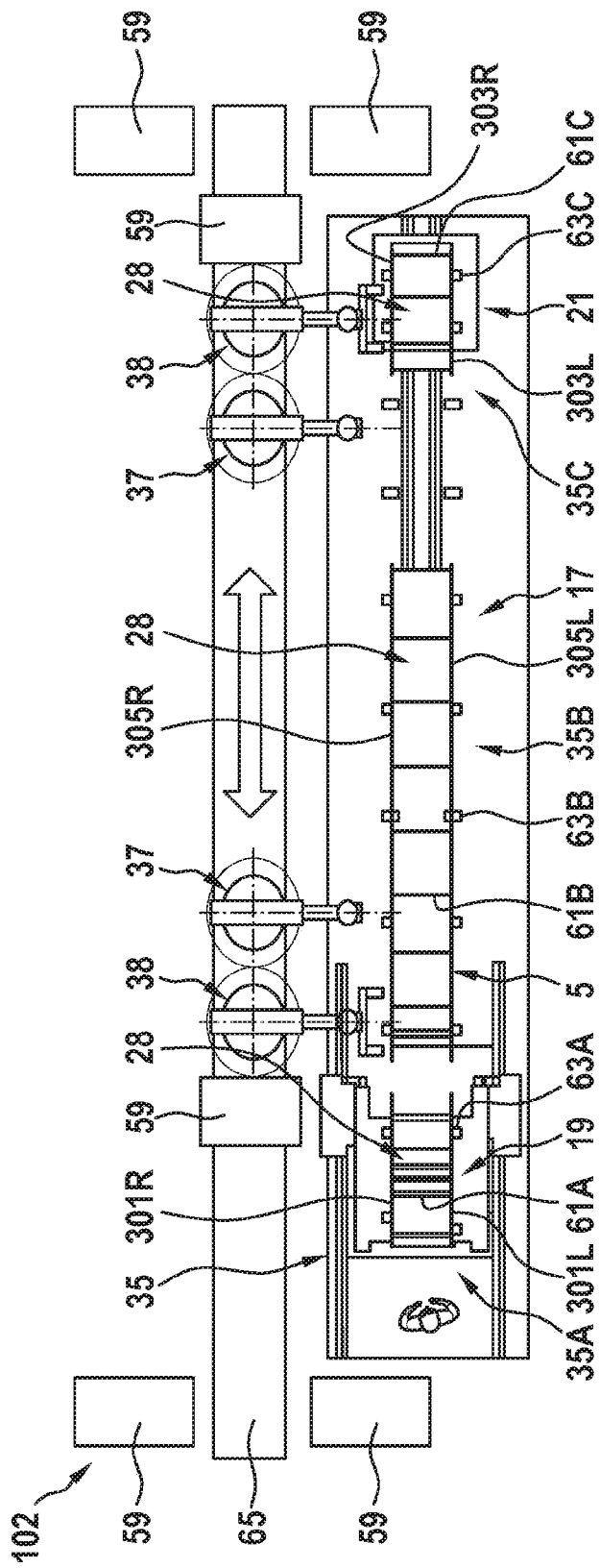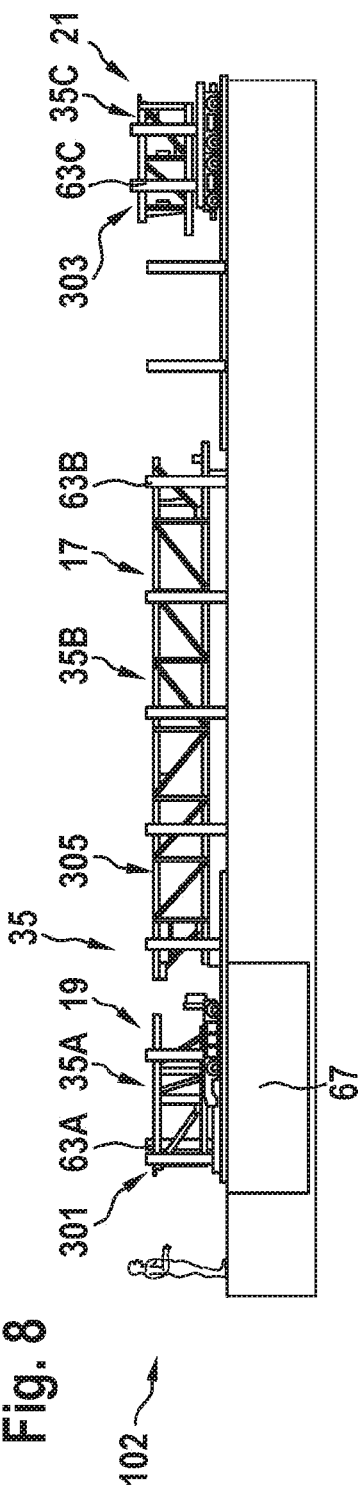

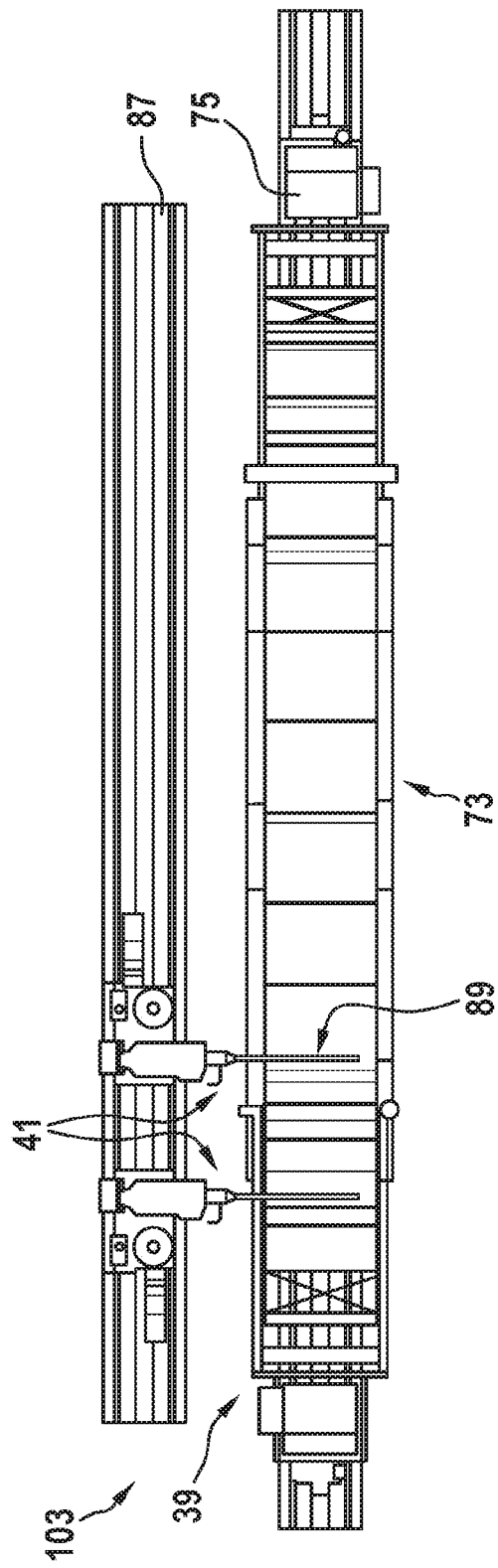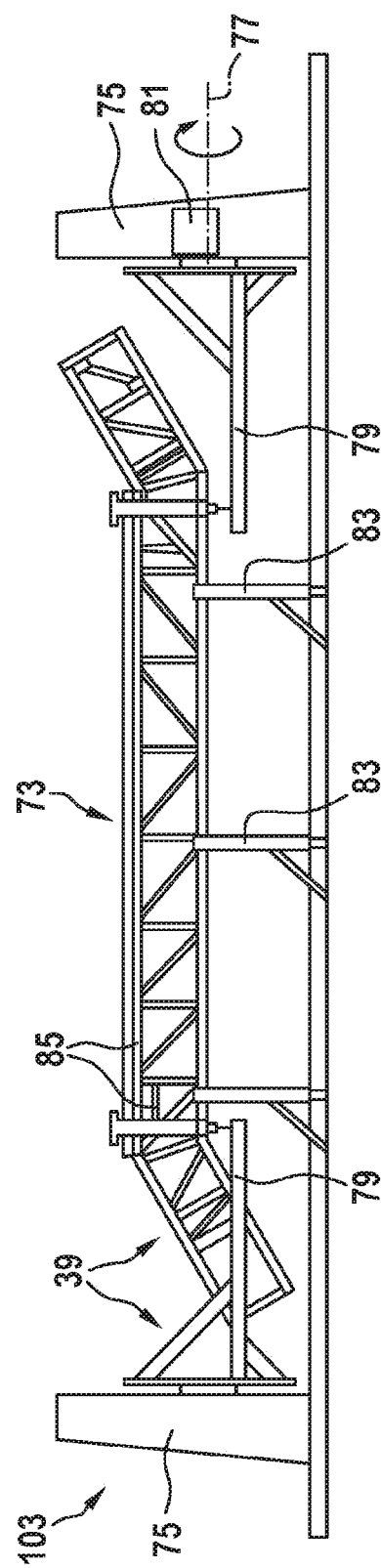

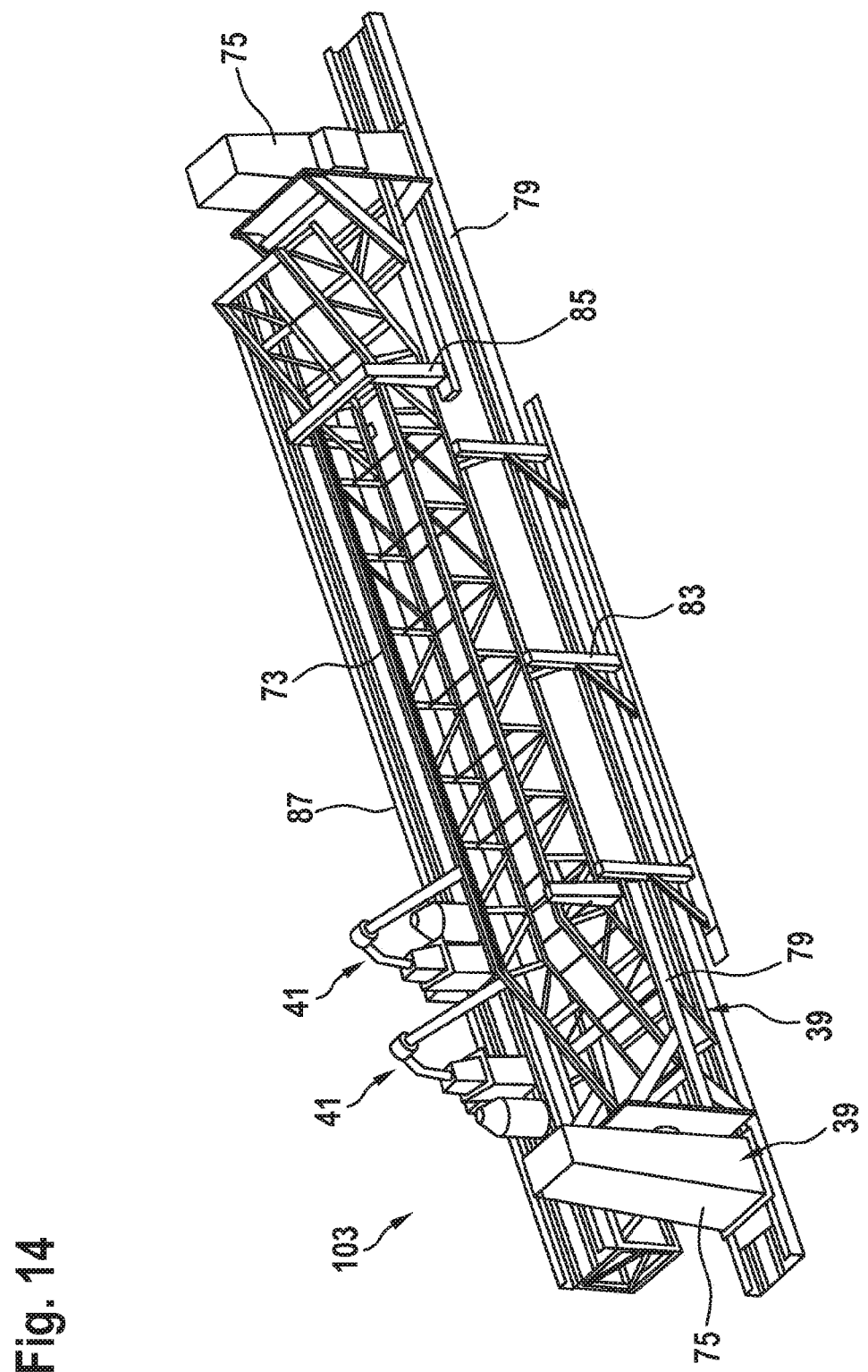

METHOD FOR A ROBOT-ASSISTED ASSEMBLY OF A SUPPORTING STRUCTURE FOR A PASSENGER TRANSPORT SYSTEM

TECHNICAL FIELD

The present invention relates to a method for the assembly of a supporting structure for a passenger transport system such as, for example, a moving staircase, a moving walkway, or the like.

SUMMARY

Passenger transport systems are used to transport passengers for example in buildings between different levels or on the same level. Moving staircases, also referred to as escalators, are regularly used, for example, to transport passengers in a building from one floor to another floor. Moving walkways may be used to transport people on one floor for example on a horizontal level or to a slightly inclined level.

Passenger transport systems generally have a supporting structure that serves as the load-bearing structure. The supporting structure is configured to better absorb the static and dynamic forces that act on the passenger transport system such as the weight of the passengers transported, the forces caused by a drive of the passenger transport system, and the like and to pass it on, for example, to bearing structures of the building in which it is located. For this purpose, the passenger transport system may be positioned at suitably designed points of contact of the building and fastened thereto. Depending on the configuration, the supporting structure may extend, for example, across two or more levels or floors of the building and/or shorter or longer distances on the same floor within the building.

A supporting structure supported at the points of contact, when mounted, may accommodate both movable and stationary components of the passenger transport system. Depending on the configuration of the passenger transport system as a moving staircase or moving walkway, such components may be a step band, pallet band, deflection axis, drive shaft, drive motor, gearing, a control system, a monitoring system, a safety system, balustrades, comb plates, bearings, belt conveyors, and/or guide rails.

For stability as well as weight reasons, supporting structures for passenger transport systems are generally designed as a framework structure. A framework forming the bearing structure generally comprises three parts or segments which are herein referred to as a bottom part, a center part, and a top part. In the event the bearing structure is to serve as a support of a moving staircase, the bottom part and the top part are generally provided as parts to be arranged horizontally, whereby the bottom part can be arranged, for example, in a lower area of the building and the top part in a higher area of the building. In this case, the center part connects the bottom part and the top part and generally runs through the building at a horizontally slanted angle.

Please note, however, that the terms bottom, center, and top part herein do not have to be interpreted as a geometric arrangement within a building. In the event the bearing structure is provided for a horizontal walkway, these parts may be arranged on the same plane consecutively and adjacently.

A framework forming the bearing structure including its bottom part, center part, and top part is generally composed of a plurality of connected, load-bearing framework components. Such framework components may include so-called top flanges and bottom flanges as well as crossbars, diagonal bars, and/or stayers connecting these flanges with each other. Furthermore, additional structures such as gusset plates, angle plates, retaining plates, oil pan plates, bottom plates, etc., may be provided.

To guarantee sufficient stability and load-bearing capacity of the supporting structure, the individual framework components must be connected with each other in a sufficiently stable manner Usually, the framework components are welded together for this purpose. Generally, each individual framework component must be welded to the other framework components of the framework so that they are stable and capable of bearing a load.

Traditionally, most of the framework components are manually welded together. Since the framework of the passenger transport system must ultimately carry people and is therefore a component for which safety is very important, certified welders must be used which then weld the framework components to each other in a very time-consuming manner. The work and time spent on this results in, among other things, high production costs.

In addition, a certain warping of the framework, i.e., a certain deviation of the actually welded framework from the intended geometry, can frequently not be avoided when the framework components are manually welded to form frameworks that usually extend across many meters. When the framework components are manually welded together, a welder must generally work his way from one end of the framework to be produced to the opposite end. In such a progressing building process, an irregular heat output generally occurs during the welding which ultimately causes the welded framework to warp. Such a warped framework must first be straightened before it is installed in a building. This creates extra work and therefore higher costs.

Furthermore, passenger transport systems may have to be produced according to different specifications and may extend, for example, across various long distances within a building. Consequently, not all frameworks to be produced for this purpose are exactly the same, but may differ from each other, for example, in particular regarding an inclination angle and/or a length of the center part. The lengths of the top part and/or the bottom part may vary from one contract to the other as well. During the production, and in particular, the welding of the frameworks for the passenger transport systems, such a large number of variations to be produced may place high demands on the logistics, and in particular, the welders performing the welding of the framework components.

EP 1 795 487 B1, EP 1 795 488 B1, and EP 1 795 489 B1 describe a method for a preassembly of a traveling system at the factory and an assembly facility for the production of a traveling system as well as the traveling system pickup and a lifting system used for this purpose. By means of the method described or by using the traveling system pickup and/or the lifting system, a preassembly of large and bulky traveling systems is to be made easier to plan and especially to control. Such assembly lines require, when adequately utilized, a high number of supporting structures per unit of time, whereby traditionally produced supporting structures can only manage this high throughput with great logistical effort and huge production facilities.

Consequently, there may be a need for a method for the production of a supporting structure for a passenger transport system and possibly an assembly to carry out this method, by means of which at least some of the deficits of conventional methods for the production of frameworks for passenger transport systems and mechanisms used for their implementation described above can be overcome. There may be a need in particular for a method and/or an assembly for the execution of the method for the production of a supporting structure for a passenger transport system which makes it possible to assemble such a framework forming such a supporting structure in a simple, reliable, cost-effective, and/or highly precise manner.

Such a need may be fulfilled with the methods as described. Preferred embodiments of the method are explained below.

According to one aspect of the present invention, a method for the production of a supporting structure for a passenger transport system is described. The supporting structure to be produced comprises a framework with a bottom part, a center part, and a top part, each made from connected, load-bearing framework components including top flanges, bottom flanges, crossbars, diagonal bars, and stayers. At least the three semi- or fully-automated process steps described below are performed in the method.

A first joining step is preferably performed at a first joining station and comprises a retention of framework components in a retention device and a welding of the framework components by means of at least one welding robot to side parts of the bottom part, side parts of the center part, and side parts of the top part of the framework.

The side parts of the bottom part, side parts of the center part, and side parts of the top part produced in the first joining step are forwarded to a second joining station.

A second joining step is performed in the second joining station and comprises at least one positioning welding of further framework components by generating tack-welded connections with the adjacently arranged side parts of the bottom part, the center part, or the top part, respectively.

The second joining step may comprise other process steps as well. Preferably, a retaining of the side parts of the bottom part, the side parts of the center part, and the side parts of the top part in at least one retention device as well as a retention of further framework components adjacently arranged between the side parts of the bottom part, the center part, and the top part in the at least one retention device is carried out at the second joining station. In most cases, two side parts each are required for the top part, the center part, and the bottom part. The second joining step may furthermore comprise a positioning welding in which the further framework components are joined by at least one welding robot through the generation of tack-welded connections with the respective adjacently side parts of the bottom part, the center part, or the top part, respectively, to form a prepositioned bottom part, a prepositioned center part, or a prepositioned top part, respectively. Furthermore, a positioning welding of the prepositioned bottom part and the prepositioned top part may be carried out through tack-welded connections at the opposite ends of the prepositioned center part to produce a prepositioned framework structure by means of the at least one welding robot. The prepositioned framework structure and/or supporting structure comprises all substantial framework components and therefore the final form.

A prior positioning welding (called tacking as well) has the advantage that the individual components keep each other in their form during the load-bearing welding (production of the load-bearing welding seams) and a warping of the components due to the high heat input during the production of the load-bearing welding seams is avoided.

A third joining step is preferably performed at a third joining station to increase the throughput of the second joining step. The third joining step comprises a retention of the entire prepositioned framework structure in a retention device and a load-bearing welding of the framework components of the entire prepositioned framework structure by generating continuous welded connections with the framework capable of bearing loads by means of at least one welding robot.

To summarize, possible characteristics and advantages of embodiments of the invention may, without limiting the invention, be considered as being based on the ideas and insights described below:

As described in the introduction, it has been found that a manual welding of framework components to form frameworks as it was traditionally performed to produce supporting structures for passenger transport systems may lead to various problems and deficits. The goal is therefore to automate the production of supporting structures for passenger transport systems at least partially, and preferably completely. In a partial automation, the production is primarily performed by machines and is only assisted by personnel. In a full automation, the production is performed completely autonomously by machines.

Attempts to implement an automated production of a framework/supporting structure for passenger transport systems have shown that the process steps and in particular the joining steps to be performed in this regard and the equipment and machines used for this purpose must be configured and/or selected in such a way that they can assemble the complex and relatively large and heavy frameworks consisting of a large number of framework components in an automated manner and, in doing so, join the framework components in a load-bearing manner. In particular, the process steps as well as possibly the equipment and the machines should be configured and/or selected in such a way that a complete production of the framework/supporting structure can be performed as efficiently as possible within a short period of time and preferably at low cost.

It was found that a complete method for the production of the framework/supporting structure should, if possible, comprise several separate but coordinated joining steps. It should be possible here to perform each individual joining step in an at least partially automated, preferably fully automated, manner Preferably, it should be possible to perform the joining steps consecutively in a temporal sequence. Here, the joining stations used for the execution can preferably cooperate with each other in a sequential arrangement, which means that each joining station may perform a joining step or a part of a joining step of a complete production sequence and, in doing so, produce interim products, which are then processed further in a next joining step in a next joining station of the sequential arrangement in the context of a further part of the production sequence, until finally the prepositioned framework/supporting structure is completed in a last joining step.

It seems advantageous here to divide the entire production process into at least two, and in some embodiments, preferably three, joining steps. In each of the joining steps, framework components or interim products from such framework components that were already joined in a previous joining step are retained in a suitably configured retention device and welded together by means of at least one welding robot. The individual joining steps as well as the retention devices and welding robots of the individual joining stations to be used to perform these steps can or even should be configured differently and carry out different tasks.

By suitably configuring each individual joining step and, if applicable, each of the individual joining stations including their retention devices and welding robots, and by suitably coordinating the individual joining steps and joining stations with each other in such a way that they can advantageously cooperate in a sequence, an advantageous and particularly efficient, executable production process may be established.

Possible details and configurations of the different joining steps and of the joining stations used for their execution are further described more specifically below in the context of a description of preferred embodiments of the invention.

In addition, it should be pointed out that the applicant of the present patent application submitted another patent application with the title "Assembly for the computer-assisted production of a supporting structure for a passenger transport system" on the same date which provides additional possible details and configurations of various joining stations, by means of which the different joining steps can be performed.

Please note that some of the potential features and benefits of the invention herein are described with reference to different embodiments and that they partially pertain to the method and partially to an assembly preferably to be used for the performance of this method for the production of a supporting structure for a passenger transport system. A person skilled in the art recognizes that the features can be suitably combined, transferred, adapted, and/or exchanged to obtain further embodiments of the invention.

BRIEF DESCRIPTION OF THE DRAWINGS

Below, the embodiments of the invention are described with reference to the enclosed drawings, whereby neither the drawings nor the description should be interpreted in a manner that would limit the invention.

FIG. 7 provides a top view of components of a second joining station of an assembly according to the invention during a first joining sub step.

FIG. 8 provides a side view of the components shown in FIG. 7.

FIG. 12 provides a top view of a third joining station of an assembly according to the invention.

FIG. 13 provides a side view of the third joining station shown in FIG. 12.

FIG. 14 provides a perspective view of the third joining station shown in FIG. 12.

The figures are only schematic and are not true to scale. The same reference symbols identify in the different figures the same characteristics or characteristics having the same effect.

DETAILED DESCRIPTION

Figure 1:
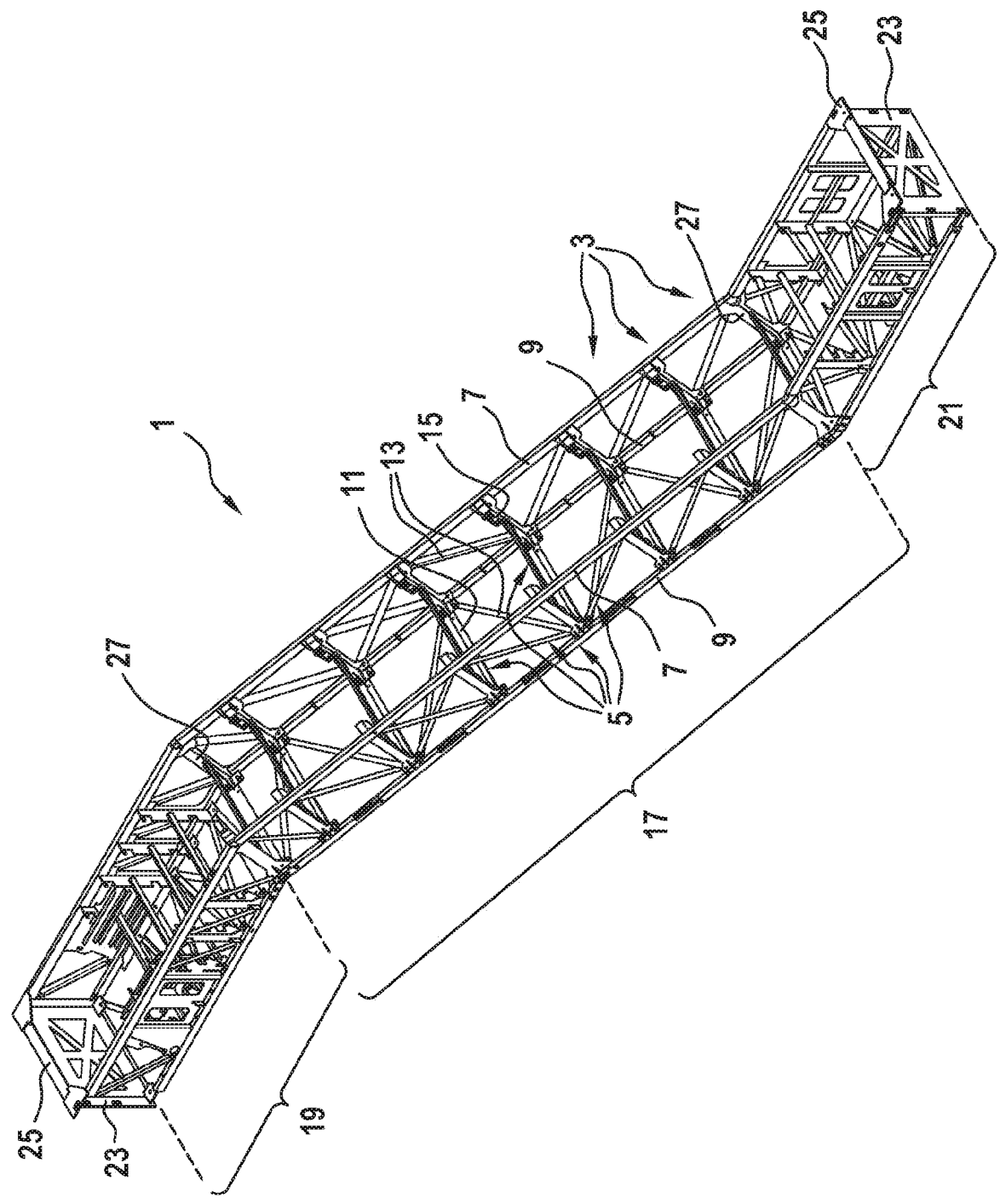
FIG. 1 shows an example of a supporting structure for a passenger transport system that can be produced with an assembly according to the invention.

FIG. 1, for example, shows a supporting structure 1 for a passenger transport system. In the example shown, the supporting structure 1 is configured as framework 3 which can form a load-bearing structure for a moving staircase, by means of which persons can be transported for example between two floors of a building.

The framework 3 of the supporting structure 1 consists of a large number of framework components 5 that are joined with each other. Here, some of the framework components 5 form top flanges 7 and bottom flanges 9 which run parallel to each other and which extend parallel to the direction of extension of the long supporting structure 1. Other framework components 5 form crossbars 11, diagonal bars 13, and stayers 15 which run diagonal to the top and bottom flanges and which connect them.

At a center part 17 of the supporting structure 1, which runs at an angle when installed in a building, a horizontally running top part 19 is connected which is configured as a framework as well and which is able to support a top landing site of the moving staircase and in which, for example, a rail block and/or a power unit may be housed. At a bottom end of the center part 17, a further bottom part 21, which is configured as a framework as well, adjoins in which, for example, a further rail block and/or a tensioning station may be accommodated.

At the top part 19 and the bottom part 21, the supporting structure 1 may, for example, be connected in the area of a framework end plate 23 with bearing structures of a building by means of support brackets 25 and supported there. At the top and bottom transitions between the center part 17 and the top part 19, or alternatively between the bottom part 21, so-called angle supports 27 are provided in the framework 3 which connect the top flanges 7 and the bottom flanges 9 with each other at a break of the framework there.

To produce a framework 3 that can serve as a supporting structure 1, traditionally, the large number of framework components 5 are manually welded together by persons who are qualified and certified as welders. Trainees usually hold the framework components 5 in the desired position relative to each other, and then they are welded together. As already explained above, such a mostly manually performed production may lead to various both technical and economic disadvantages, such as high labor and time expenditure, high cost for the certified welders that must be used for quality assurance purposes, a mostly subsequently required straightening of the framework due to the irregular heat input during the welding process and the resulting warping of the welded framework, high logistic efforts, etc.

Therefore, an assembly or a method that is preferably performed with this assembly for the production of a framework for a passenger transport system is described herein in which important production steps for the production of the supporting structure to be ultimately produced can be performed by means of suitably configured retention devices and welding robots in several coordinated joining stations in an either semiautomated, or fully automated manner.

Figure 2:
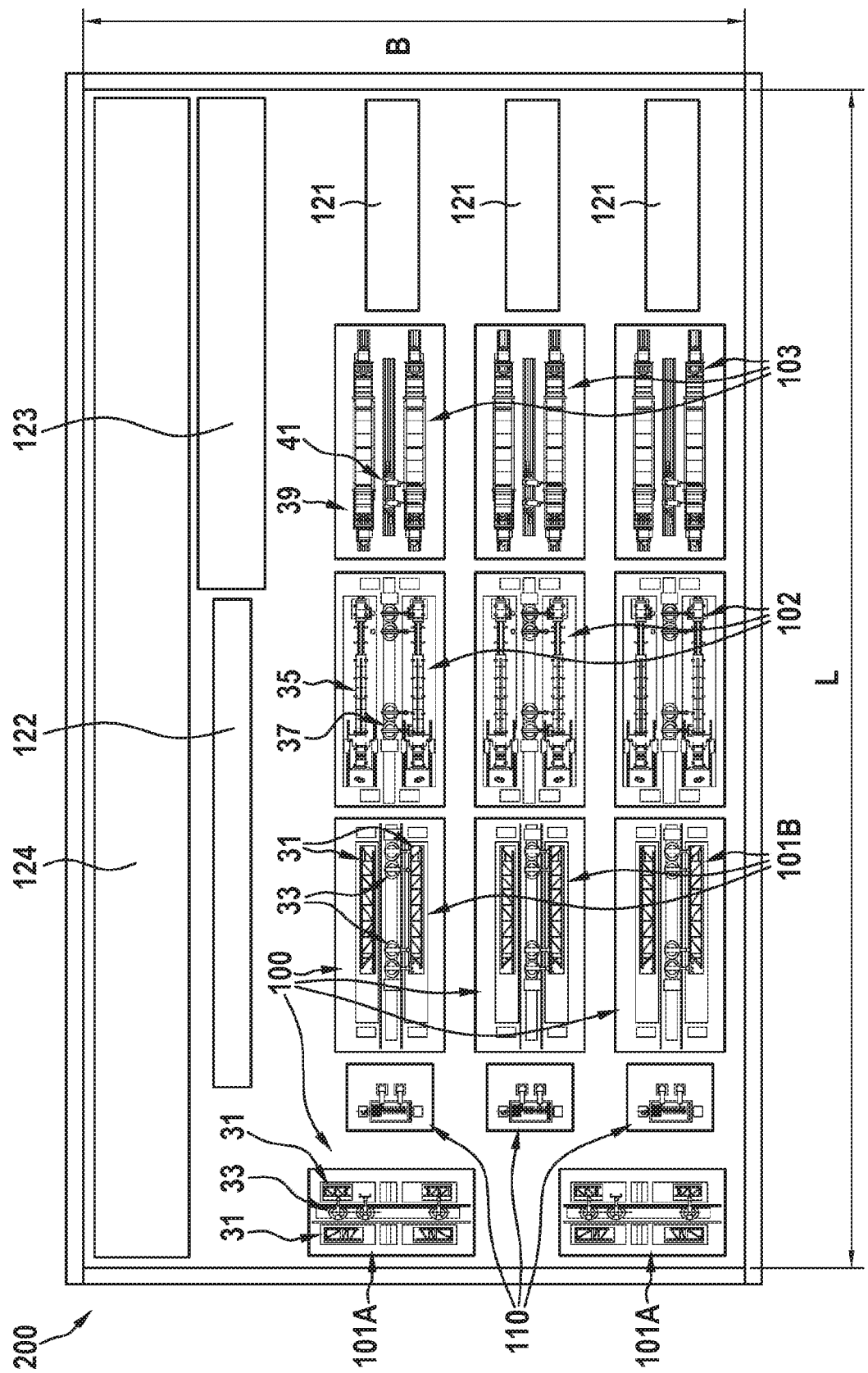
FIG. 2 illustrates a production line for the production of supporting structures for passenger transport systems according to one embodiment of the present invention.

Referencing FIG. 2, we will first describe a production line according to the invention and provide an overview of the assemblies used therein for the production of supporting structures for passenger transport systems. Referencing FIGS. 3 to 14, we will then describe details of tools and machines used in the various joining stations of the production assemblies and the respective method and joining steps to be performed.

FIG. 2 schematically depicts a production line according to the invention by means of which a large number of supporting structures for passenger transport systems can be produced at an industrial scale in either a semi- or fully automated manner. The production line 200 comprises several assemblies 100 according to the invention for the production of supporting structures 1 for passenger transport systems (hereinafter referred to as the "production assembly 100"). Each of the production assemblies 100 comprises a first joining station 101, a second joining station 102, and a third joining station 103. These three joining stations 101, 102, 103 are spatially arranged in a sequential order. This way, the joining steps to be performed by the individual joining stations 101, 102, 103 can be performed in a temporally consecutive sequence and the interim products that are produced pass on from one of the joining stations 101, 102, 103 to a next joining station.

Each of the production assemblies 100 furthermore comprises a prejoining station 110 which is upstream from the first joining station 101.

Additional and/or supplementary stations which can be used before, during, or after the joining steps to be performed by the three joining stations 101, 102, 103 may furthermore be provided downstream from the third joining station 103. A finishing station 121 may follow the third joining station 103, for example. Furthermore, a sandblast station 122, a station 123 for preparing the cutting, sawing, and welding, as well as a storage area 124, in which, for example, raw components and the add-on components to be fastened to them or even the finished supporting structure may be stored, may be provided.

In each of the production assemblies 100, the joining stations 101, 102, 103 provided therein are configured to work in a semiautomated or fully automated manner and to favorably cooperate with each other in this process. The individual joining stations 101, 102, 103 are therefore suitable for being equipped with equipment such as retention devices and welding robots and, if applicable, handling robots as well so that the joining steps to be performed by them are coordinated in such a way that at each of the joining stations 101, 102, 103 a part of the overall production sequence can be performed and that the thereby produced interim products are processed in such a way that they can be processed to the next joining station in the sequence and processed further there.

The individual joining stations 101, 102, 103 and the joining steps to be performed there are preferably coordinated in such a way that the durations or cycle rates within which the individual joining steps are performed have approximately the same length in the different joining stations 101, 102, 103. This way, the interim products in the individual joining stations 101, 102, 103 can be processed with a predefined cycle rate and then passed on to the next joining station or another station within the production line 200.

The production assembly 100 comprises in its first joining station 101 at least one retention device 31 as well as at least one welding robot 33. The purpose of the retention device is to retain the framework components during a first joining step.

The terms "retention device" and "retain" are to be interpreted broadly here. "To retain" may mean for example that framework components are supported or mounted and, preferably, fastened in an absolute position or in a relative position, for example a relative position in relation to other framework components, and/or, if applicable, first placed at this position. A retention device may, for example, be a simple, stationary retaining structure such as a table which retains the framework component only passively, i.e., for example, against the force of gravity. Alternatively, the retention device may be configured for both retaining the framework components and for being able to actively move them as well. A retention device may be configured, for example, in the form of a handling robot or a self-displaceable machine. If applicable, the retention device may consist of several partial devices as well.

The at least one welding robot of the first joining station has the purpose and is specifically configured to weld together framework components into two side parts of the bottom part 21, two side parts of the top part 19, and two side parts of the center part 17 of the framework 3 during the first joining step.

In the present exemplary embodiment, two side parts each of the bottom part 21, two side parts of the top part 19, and two side parts of the center part 17 are created in the joining stations 101, 102, 103. For frameworks 3 of two moving staircases next to each other, additional central parts that are similar to the side parts would be required, which would then be installed in the second joining station on the median longitudinal plane of the prepositioned framework. The joining stations 101, 102, 103 may be configured accordingly so that they can create and install these central parts as well. Of course, the side parts, in particular the side parts of the center part 17, can be subdivided into several sections as well, which can be joined by screw connections. This way, a passenger transport system in a modular design can be created whose modules are easier to integrate into an existing building than the passenger transport system in one piece.

The second joining station 102 of the production assembly 100 comprises at least one retention device 35 and at least one welding robot 37 as well. The at least one retention device 35 as well as the at least one welding robot 37 of the second joining station 102 are, however, configured differently than the equipment of the first joining station 101 referred to under the same name.

In particular, the retention device 35 of the second joining station 102 is specifically configured to retain during a second joining step the side parts of the bottom part 21, the center part 17, and the top part 19, which were previously produced in the first joining station 102 and furthermore, to retain adjoining additional framework components between these side parts. The side parts typically consist of top flanges 7, bottom flanges 9, diagonal bars 13, and stayers 15 and substantially form two-dimensional constructs. The retention device 35 of the second joining station 102 preferably retains these side parts in an upright, i.e., vertical, direction. Between two adjoining side parts, the retention device furthermore retains other framework components such as diagonal bars and crossbars, which are preferably retained in a reclined position, arranged in such a way that they adjoin the framework components of the side parts and basically connect them with each other.

The at least one welding robot 37 of the second joining station 102 is then configured to positioningly weld together the other framework components with the adjacently arranged side parts of the bottom part 21, the center part 17, and the top part 19 with a prepositioned bottom part 21, a prepositioned center part 17, and a prepositioned top part 19.

The term of a "positioning welding" is to mean that the relative framework components are provisionally joined at a certain position relative to each other by a welding process without the welding performed in this regard having to have load-bearing properties. Such a positioning welding may be, for example, spot-welding or tack-welding.

In addition, the at least one welding robot 37 of the second joining station 102 is configured to weld the positioning welding of the prepositioned bottom part 21 and the prepositioned top part 19 at the opposite ends of the prepositioned center part 17 and to ultimately form a completely prepositioned framework structure 73 by means of such a positioning welding. In this stage, the prepositioned framework structure 73 is preferably welded so that it is self-sustaining but not fully able to take a load.

The third joining station 103 of the production assembly 100 also comprises a retention device 39 as well as at least one welding robot 41. In this case as well, the retention device 39 and the welding robot 41 are configured for specific tasks and purposes and may, with regard to their configuration and mode of operation, differ from equipment of the first and second joining station 101, 102 with the same name.

The retention device 39 of the third joining station 103 is, in particular, configured to retain the entire prepositioned framework structure 73 produced during the second joining step during a third joining step. The at least one welding robot 41 is configured to join during the third joining step the framework components of the previously only positioning welded prepositioned framework structure 73 by means of a load-bearing welding together of the framework component to form a framework that is capable of bearing a load.

A "load-bearing welding together" means that the framework components to be joined are welded together with preferably continuous, load-bearing welding seams. The load-bearing welding seams are therefore capable of transferring the forces acting on the framework components according to their calculated configuration.

Below, the different joining steps that are proposed here in the context of a method for producing a supporting structure of a passenger transport system as well as possible details of the joining stations 101, 102 103 of a production assembly 100 to be used for this purpose are described with reference to FIGS. 3 to 14.

It should be noted that the embodiments shown in the figures and explained in the following descriptions are only exemplary and that both the production method and the production assembly 100 used for this purpose may be configured differently in the context of the definitions provided by the claims. In particular, a number and/or specific configuration of retention devices and/or welding robots and/or other equipment in the different joining stations 101, 102, 103 as well as in the prejoining station 110 may differ from the embodiments described and depicted herein.

a) Prejoining Step at the Joining Station 110

Figure 3:
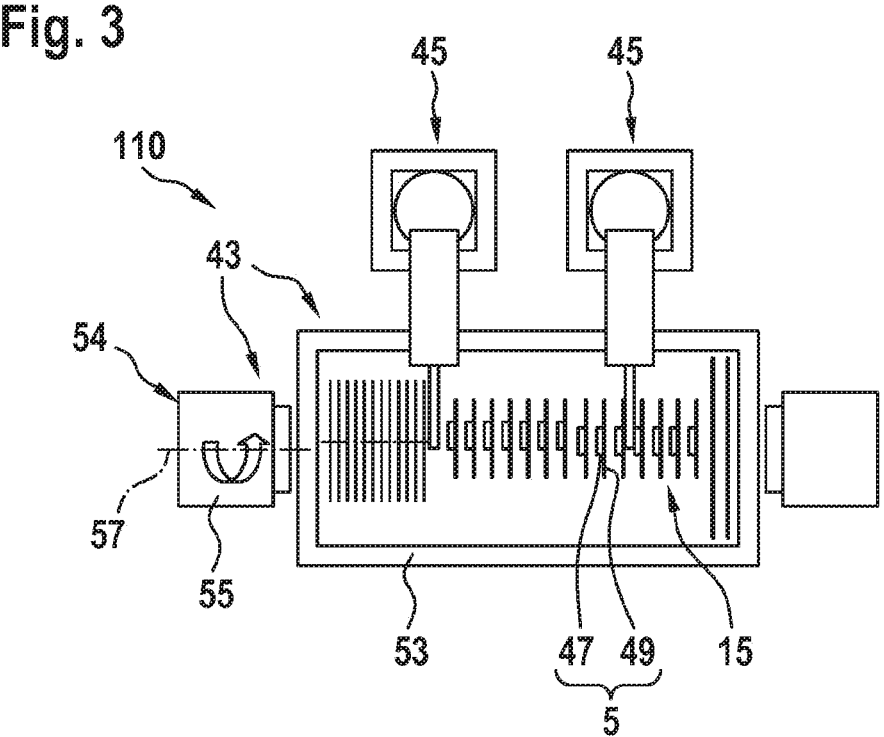
FIG. 3 provides a top view of a prejoining station for an assembly according to the invention.
Figure 4:
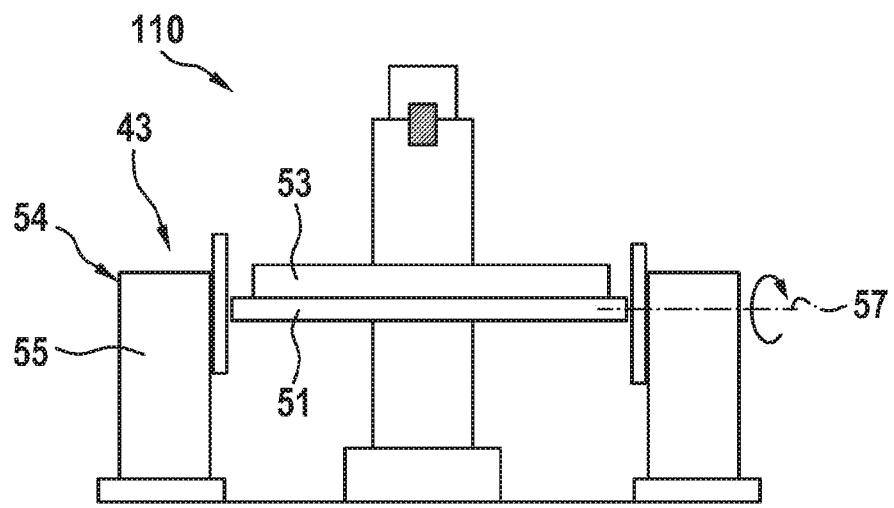
FIG. 4 provides a side view of the prejoining station shown in FIG. 3.

FIGS. 3 and 4 provide a top view and a side view from the front of a prejoining station 110. The prejoining station 110 comprises at least one retention device 43 as well as at least one welding robot 45. The retention device 43 is used in a prejoining step to retain the basic material components 47 and the accessory components 49 to be attached to them. The at least one welding robot 45 is then used to weld together the basic material components 47 and the accessory components 49 to be attached to them to form framework components 5.

During the prejoining step, the basic material components 47 and the accessory components 49 to be attached to them may be jointly rotated by means of a suitably configured retention device 43 of the prejoining station 110 around an axis of rotation 57. This way, the basic material components 47 and the accessory components 49 may be brought into a suitable orientation so that the welding robot 45 can then weld them together.

In the example shown, the prejoining station 110 may be configured to weld together and join for example metal profiles serving as basic material components 47 and gusset plates serving as the accessory components 49 to be attached to them to form stayers 15. The stayers 15 may then be provided in the subsequent joining steps as framework components 5 and processed further.

In the embodiment shown, the retention device 43 of the prejoining station 110 is configured as a turning system 54 with a clamping frame 51 for exchangeable device cartridges 53. The turning system 54 comprises a motor-driven turner 55, by means of which the clamping frame 51 can be rotated around the horizontal axis of rotation 57. The device cartridge 53 may, for example, be attached to the clamping frame 51 by means of a rapid clamping system. By means of the turner 55, therefore, the device cartridge 53 may be rotated around the axis of rotation 57 by up to 360°.

In the device cartridge 53, the parts to be welded together, i.e., in particular the basic material components 47 and/or the ancillary components 49, may be inserted and/or retained. These parts may be suitably positioned here relative to each other by the device cartridge 53. The basic material components 47 and the ancillary components 49 to be attached to them may then be welded together by means of the welding robot 45. Depending on the later intended use, only provisionally positioning weldings, for example tack-weldings, or weldings capable of bearing a load, for example continuous welding seams, may be produced.

With a production line 200, several prejoining stations 110 may be provided, by means of which different types of framework components 5 may be joined and welded together from the respective raw material components 47 and accessory components 49. Preassemblies in the form of stayers, diagonal bars, crossbars, etc., with the appropriately attached accessory components 49 may be preproduced and provided in the subsequent joining steps as framework components 5. The device cartridges 53 to be used may differ from each other depending on the basic material components 47 and the accessory components 49. The welding robot or welding robots 45 to be used for the welding process may be adapted to and/or programmed for a specific preassembly to be produced. Depending on the control concept, the processing programs of the welding robots 45 may be administered centrally or locally. A local administration requires that the welding robot 45 identifies the device cartridge 53 temporarily arranged on the clamping frame 51 and that it can initiate and execute the respective processing programs. The welding robots 45 may be configured, for example, to automatically move and actuate a welding head. The welding robot 45 can move the welding head for example in a linear (i.e., one-dimensional) direction, on a plane (i.e., two-dimensional), or preferably even in any direction (i.e., three-dimensional).

b) First Joining Step at the First Joining Station 101

Figure 5:
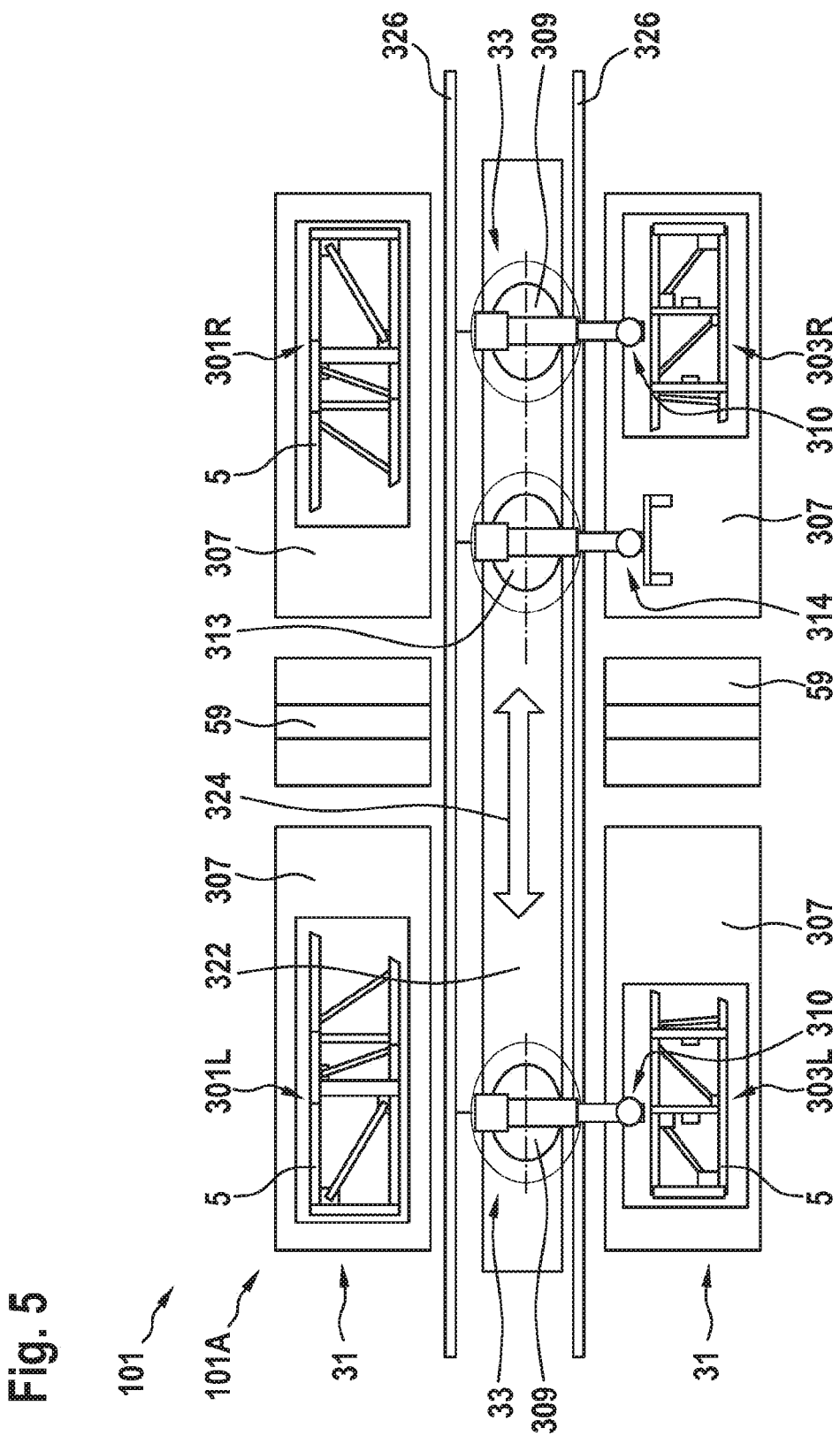
FIG. 5 provides a top view of components of a first joining station of an assembly according to the invention.
Figure 6:
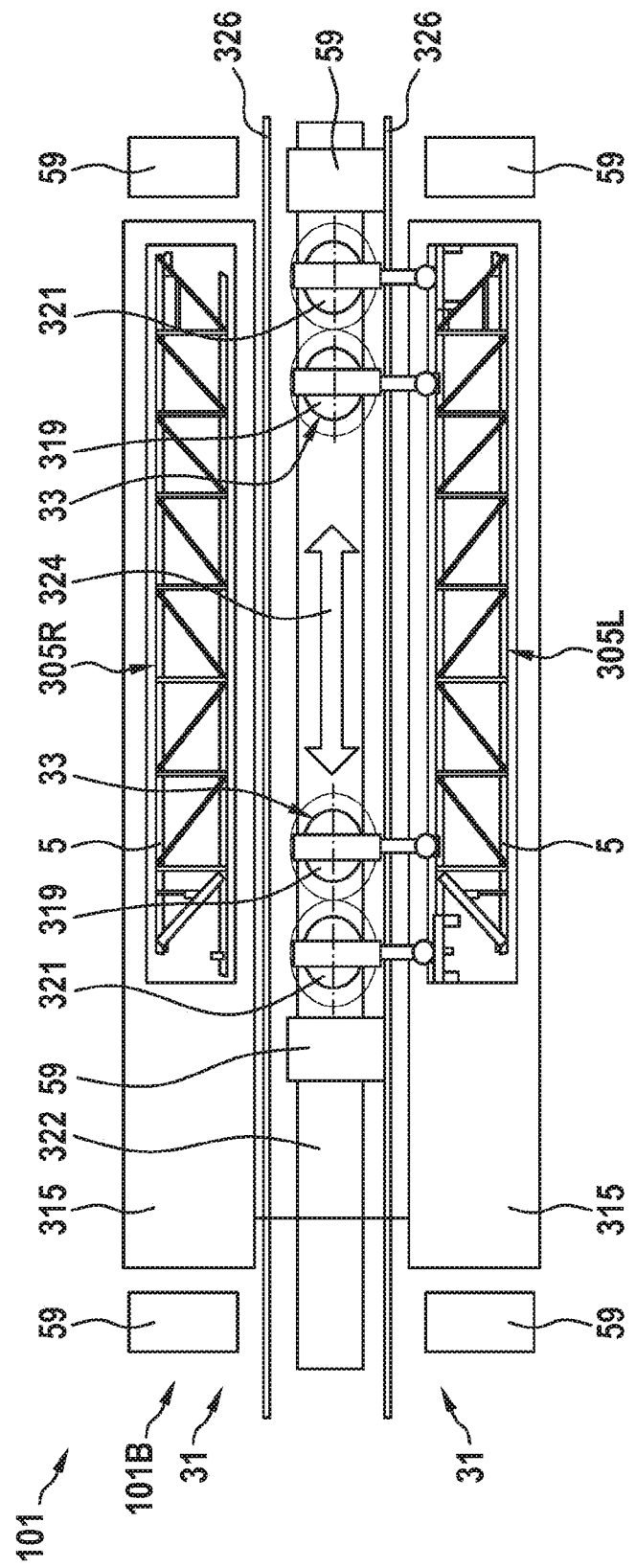
FIG. 6 provides a top view of further components of the first joining station of the assembly according to the invention.

FIGS. 5 and 6 provide top views of exemplary subareas 101A, 101B of a first joining station 101 for a production assembly 100 according to the invention. The subarea 101A of the first joining station 101 is configured here to link suitably preproduced framework components 5 and to join them with the left and right side parts 301L, 301R of the top part 19 of the framework 3 as well as with the left and right side parts 303L, 303R of the bottom part 21 of the framework 3. The other subarea 101B of the first joining station 101 is provided to join left and right side parts 305L, 305R of the center part 17 of the framework 3 from the framework components 5 provided.

In the first joining station 101 shown as an example, the retention devices 31 and the welding robots 33 provided in the different subareas 101A, 101B are differently configured and arranged.

Two retention devices 31 are provided in the form of two rigid tables 307 for the production of the subarea 101A of the first joining station 101 intended for the production of the side parts 301L, 301R, 303L, 303R of the top and bottom part 19, 21. Two rigid tables 307 may retain the framework component 5 provided for the production of the side parts 301L, 301R of the top part 19. The framework components 5 may be placed on one of the tables 307 and suitably positioned relative to each other. Two further tables 307 may retain the framework components 5 to be joined for the production of the side parts 303L, 303R of the bottom part 21. One parts magazine 59 may be provided between two tables 307 placed next to each other in the longitudinal direction in which the framework components 5 to be provided for the production of the top part 19 or the bottom part 21, respectively, may be accommodated. The tables 307 serve here as the first retention devices.

One welding robot 309 is assigned to each of these first retention devices 307. The welding robots 309 are configured to weld together the framework components 5 of the top part 19 or of the bottom part 21, respectively, to form the two side parts 301L, 301R and/or 303L, 303R of the top part 19 and/or the bottom part 21. For this purpose, the welding robots 309 can move their welding heads 310 if possible in at least two dimensions, preferably in three dimensions.

Furthermore, a handling robot 313 is assigned to each of the first retention devices 307. If applicable, a single handling robot 313 may serve both first retention devices 307. It is possible to provide several handling robots 313 as well, however. A handling robot 313 may be configured to handle the respective framework components 5 of the top part 19 and/or the bottom part 21 in an actively moving manner. For this purpose, the handling robot 313 may comprise, for example, a gripper arm 314 or the like. The handling robot 313 may, for example, remove framework components 5 from the parts magazine 59, place them on one of the first retention devices 307, and, if applicable, suitably position them there.

In a second area 101B of the first joining station 101, a second retention device 315 may be provided for example in the form of two rigid tables. On this second retention device 315, framework components 5 for the side parts 305R, 305L of the center part 17 may be retained or positioned. Furthermore, two of the welding robots 319 assigned to the second retention device 315 are configured to weld together the framework components 5 of the center part 17 to form the two side parts 305R, 305L. In addition, two of the handling robots 321 assigned to the second retention device 315 are provided and configured to handle the respective framework components 5 of the center part 17 in an actively moving manner.

The welding robots 309, 319 and/or the handling robots 313, 321 can be configured to translationally move their position in a direction parallel to a longitudinal extension direction of the bottom part 21, top part 19, or center part 17 positioned on a corresponding retention device 305, 307, 315. The direction of the movement 324 is indicated by arrows in FIGS. 5 and 6. The robots 309, 313, 319, 321 may move along a track 322 or along rails. As protective measures, movable separating walls 326 may be provided which may extend for example parallel to the direction of the movement 324. If applicable, parts magazines 59 may be coupled with one of the movable robots 309, 313, 319, 321 and may be moved together with these.

During a first joining step, the first joining station 101 may be used to handle the respective framework components 5 of the bottom part and/or the top part 19 by means of a handling robot 313 assigned to one of the two first retention devices 307 by means of this first retention device 307 and to bring them into position. The respective framework components 5 of the bottom part 21 and/or the top part 19 may then be retained in one of the first retention devices 307 and welded together there by means of a respectively assigned welding robot 309 to form the side parts 301L, 301R of the top part 19 and/or side parts 303L, 303R of the bottom part 21. In a similar way, the respective framework components 5 of the center part 17 can be actively handled during the first joining step by a handling robot 321 assigned to a second retention device 315 in the other subarea 101B of the first joining station 101 and brought in position before they are then welded together there by means of the respectively assigned welding robot 319 to form two side parts 305R, 305L of the center part 17.

In other words and specifically relating to the exemplary embodiment shown in FIGS. 5 and 6, three workstations are provided in the first joining station 101 to be able to produce the respective left and right side parts 301, 303, 305 for the top part 19, the bottom part 21, or the center part 17 of the framework 3. Each of these three workstations has two rigid device tables, one for a left side part and one for a right side part. One handling robot 313 and one welding robot 309 are arranged between these device tables serving as retention devices 307 for the side parts 301, 303 of the top part 19 and the bottom part 21. For the side parts 305 of the center part 17, preferably two handling robots 321 and two welding robots 319 are provided.

During the first joining step, one of the handling robots 313, 321 places the framework components 5 required for one of the side parts 301, 303, 305 in the form of preassemblies and components on one of the device tables in a correct position. A corresponding welding robot 309, 319 then welds all the parts of the respective side part 301, 303, 305 together. The handling robot 313, 321 removes the preassemblies, components, and/or framework components 5 for example from one or more part magazines 59. If applicable, the handling robot 313, 321 can be configured so that it can lift and remove the completely welded side parts 301, 303, 305 from a device table.

c) Second Joining Step at the Second Joining Station 102

After the framework components 5 are welded together to form the left and right side parts 301, 303, 305 of the top part 19, the bottom part 21, and the center part 17 in the first joining step, these side parts 301, 303, 305 are then transported from the first joining station 101 to the second joining station 102. For this purpose, cranes, special vehicles, or the like may be used, for example, in a production line 200. Here, the side parts 301, 303, 305 are retained by slips 63A, 63B, 63C as shown in FIG. 7 and FIG. 8.

In the second joining station 102, first the respective side parts 301, 303, 305 are welded together as the first partial joining step of a second joining step to be performed there by welding together further framework components 5 such as crossbars 61B that connect a left and a right side part to form a prepositioned top part 19, a prepositioned bottom part 21, or a prepositioned center part 17. In this state, however, the framework components 5 are not load-bearing yet, but only welded together in a positioning manner, for example by spot- or tack-welding.

Then, in the second joining station 102 as well, the entire prepositioned framework structure 73 is welded together as a second partial joining step. For this purpose, the prepositioningly welded prepositioned top part 19 and the prepositionedly welded, prepositioned bottom part 21 are each moved toward the also prepositioningly welded center part 17, rotated relative to the same at a desired angle, and then welded to the same in a positioning manner; i.e., it is attached to the center part 17 in a spot- or tack-welding method.

FIGS. 7 to 11 show the second joining station 102 from a top and a side view as well as a perspective view during both partial joining steps of the second joining step.

The retention device 35 of the second joining station 102 comprises first, second, and third parts retention devices 35A, 35B, 35C. The first parts retention device 35A is adjacently arranged between the two opposing side parts 301R, 301L of the top part 19 for retaining the left and the right side part 301L, 301R of the top part 19 and for retaining other framework components 61A. In a similar manner, the second parts retention device 35B for retaining the two side parts 305L, 305R of the center part 17 and for retaining other framework components 61B is adjacently arranged between the side parts 305L, 305R of the center part 17. The third parts retention device 35C is adjacently arranged for retaining the two side parts 303L, 303R of the bottom part 21 and for retaining other framework components 61C between the side parts 303L, 303R of the bottom part 21. The first and third parts retention devices 35A, 35C are configured so that they can be moved relative to the second parts retention device 35B.

The parts retention devices 35A, 35B, 35C are configured for retaining the respective left and right side parts 301L, 301R, 303L, 303R, 305L, 305R in an upright, i.e., vertical, position. For this purpose, the retention device 35 of the second joining station 102 may comprise slips 63A, 63B, 63C at their three parts retention devices 35A, 35B, 35C. The slips 63B for the center part 17 are preferably locally fixed, whereas the slips 63A, 63C for the top part 19 and the bottom part 21 can be moved horizontally together with the first and/or third parts retention device 35A, 35C relative to the slip 63B of the second parts retention device 35B.

A second joining step of a production method to be carried out by means of the second joining station 102 can then be divided into two partial joining steps.

During a first partial joining step, as is illustrated in FIGS. 7 and 8, the respective side parts 301, 303, 305 of the top, center, and bottom parts 19, 17, 21 as well as the other framework components 61A, 61B, 61C are adjacently arranged, for example by means of the handling robot 38, and retained in their respective orientations. In this position, they can then be welded together by means of a welding robot 37 in an at least positioning, temporary manner and the prepositioned prepositioned top part 19, the prepositioned prepositioned center part 17, and the prepositioned prepositioned bottom part 21 can thereby be formed in this manner.

More specifically, the two side parts 301R, 301L of the top part 19 as well as the other framework components 61A are adjacently arranged between the side parts 301L, 301R of the top part 19 in the first parts retention device 35A. The two side parts 305L, 305R of the center part 17 as well as other framework components 61B are adjacently arranged between the side parts 305L, 305R of the center part 17 in the second parts retention device 35B. The two side parts 303L, 303R of the bottom part 21 as well as the other framework components 61C that are adjacently arranged between the respective side parts 303L, 303R are retained in the third parts retention device 35C.

During this first partial joining step of the second joining step, the first and the third parts retention devices 35A, 35C are still arranged at a distance from the second parts retention device 35B in the longitudinal direction, as shown in FIGS. 7 and 8. In such a configuration, the welding robots 37 as well as any handling robots 38 of the second joining station to be provided can easily handle the respective side parts 301, 303, 305 as well as the other framework components 61A, 61B, 61C to be arranged between them and weld them together in a positioning manner.

Figure 9:
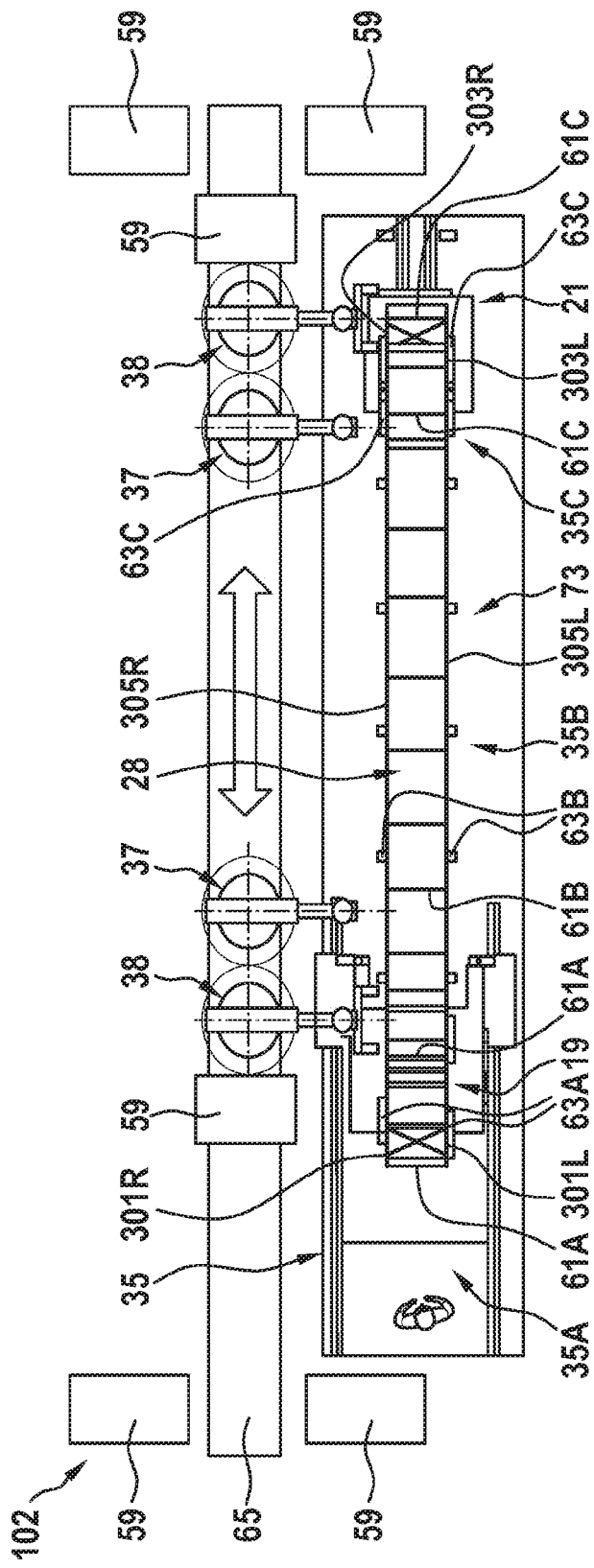
FIG. 9 provides a top view of the components of the second joining station shown in FIG. 7 during a second joining substep.
Figure 10:
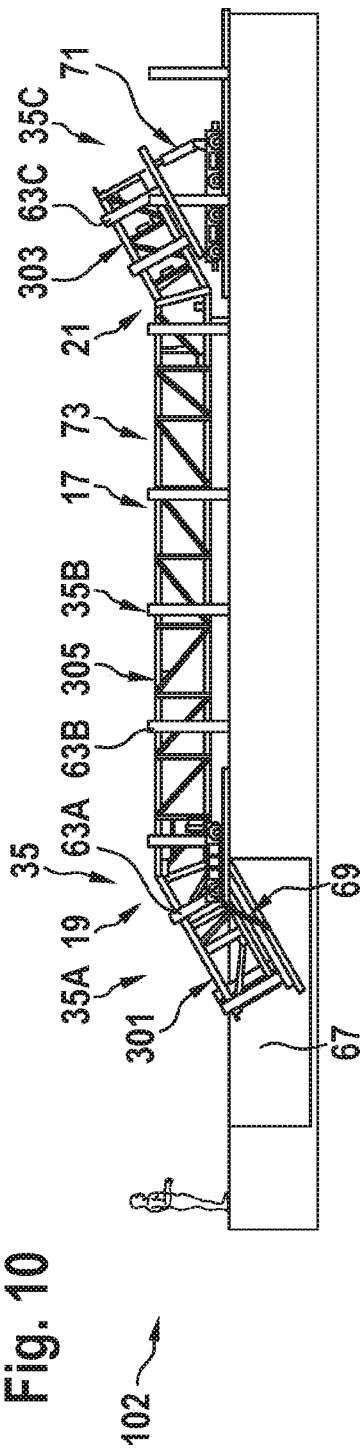
FIG. 10 provides a side view of the components shown in FIG. 9.
Figure 11:
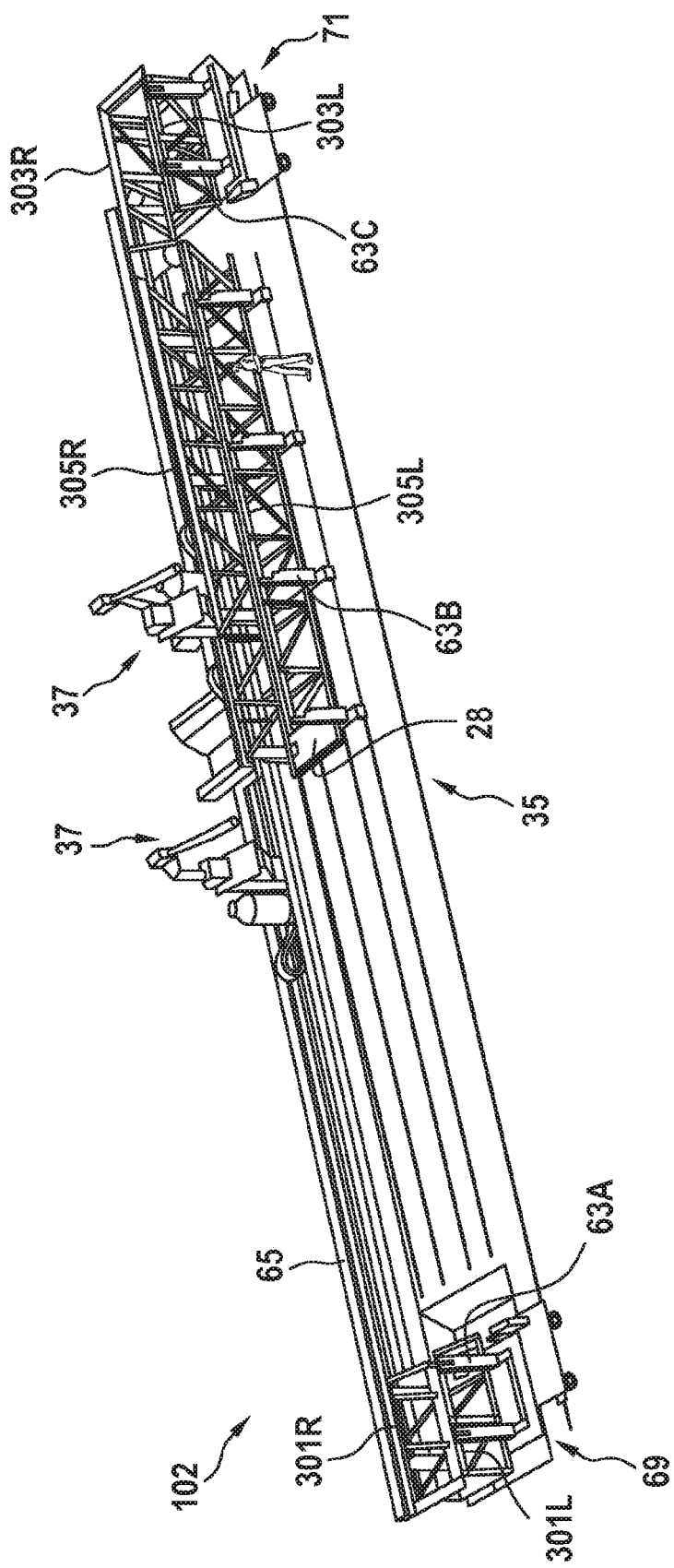
FIG. 11 provides a perspective view of a second joining station of an assembly according to the invention.

The prepositioningly welded prepositioned top, center, and bottom parts 19, 17, 21 produced in this manner are then put together in a second partial joining step of the second joining step, as it is shown in FIGS. 9 and 10, to form an overall prepositioned framework structure 73. For this purpose, the first and the third parts retention devices 35A, 35C are moved together with the prepositioningly welded prepositioned top and bottom parts 19, 21 held relative to the second parts retention device 35B and the prepositioningly welded prepositioned center part 17.

The movement of the first and third parts retention devices 35A, 35C may comprise a lateral, generally horizontal process on the one hand and a tilting process on the other. In other words, for example, the first parts retention device 35A may be laterally moved toward the second parts retention device 35B until a lateral end of the prepositioned welded top part 19 retained on the first parts retention device 35A adjoins an opposite end of the prepositionedly welded prepositioned center part 17 held on the second parts retention device 35B.

In addition to such a lateral process, the first parts retention device 35A can then be configured to tilt the prepositioned top part 19 relative to the prepositioned center part 17 to bring it into an orientation that is desired later for the completed framework 3. In other words, the top part 19 and the center part 17 may initially be moved toward each other on the same plate, but then the top part 19 is tilted out of this plane so that the longitudinal extension directions of the top part 19 and of the center part 17 are located at an angle to each other. The angle substantially corresponds to the inclination angle in which later the center part 17 is to be arranged relative to the top part 19, which is generally to be arranged horizontally, within a building.

Accordingly, the bottom part 21 may initially be laterally moved toward the center part 17 and subsequently tilted relative to the same.

To be able to suitably tilt the top part 19 relative to the center part 17, for example, the first parts retention device 35A may be configured to pivot its components retaining the top part 19 relative to the second parts retention device 35B. To be able to obtain an angle arrangement of the top part 19 relative to the center part 17 that is ultimately desirable for the framework 3 to be produced, it should be possible to tilt the top part 19 downward as well in the event the center part 17 should be held at ground level and therefore horizontally. For this purpose, a sufficiently large pit 67 may be provided at the first parts retention device 35A, into which the end of the top part 19 facing away from the center part 17 can be lowered. For this purpose, a lowerable tilting mechanism 69 may be provided on the first parts retention device 35A.

In a similar way, it may be provided that the previously prepositioningly welded bottom part 21 is laterally moved toward the center part 17 during the second partial joining step of the second joining step and tilted relative to the same. The third parts retention device 35C may have a liftable tilting mechanism 71 for this purpose, by means of which an end of the bottom part 21 facing away from the center part 17 may be lifted.

The lowerable tilting mechanism 69 and the liftable tilting mechanism 71 may, for example, comprise hydraulics. They may, in particular, be configured so that the top part 19 or respectively the bottom part 21 is tilted downward or upward by an angle of typically up to 50°, mostly between 20° and 40°, frequently by an angle of approximately 35°.

Below, a possible configuration of the second joining station 102 as well as the second joining step to be performed there is explained once more by using a slightly different wording, i.e., not necessarily with the terms used in the claims, in order to further clarify potential configurations of the production assembly and/or the production method.

In the second joining station 102, the side parts 301, 303, 305 that were joined during the first joining step with other assemblies and framework components 5 are ultimately joined to form the finished framework 3, whereby the framework 3 in this stage of the process may already have its final form, but not necessarily its final load-bearing capacity. The joining process comprises at least two partial joining steps.

During the first partial joining step (FIGS. 7 and 8), the right and the left side part 301R, 301L of the top part 19 are joined with each other by insertion of further framework components 61A such as, for example, crossbars 11 or oil plates 28 by means of tack-welds. There, where for example for stability reasons a simple tacking does not suffice, at least some areas may have to be subjected to penetration welding. Where possible, the parts are only tack-welded. Penetration welding is primarily performed in the third joining step described below.

A choice between tack-welding and penetration welding in the second joining station 102 or the second joining step may be made not only depending on the desired stability but also on the time required. This means that the time the framework spends in the second joining station 102, i.e., the time required for the second joining step, and the corresponding time spent in the third joining station 103 should be approximately equivalent, at least as far as the same number of workstations are available in the second joining station 102 and the third joining station 103. Obviously, the number of workstations in the second and third joining station 102, 103 may differ as well.

The same tacking and/or welding is also performed on the side parts 305R, 305L, 303R, 303L of the center part 17 and/or the bottom part 21 as well as between these interpositioned other framework components 61B, 61C. The prepositioned top, center, and bottom parts 19, 17, 21 produced in the context of this first partial joining step of the second joining step already have the U-shaped framework cross-section that is typical for a framework 3 of the passenger transport system.

In the second partial joining step of the second joining step, the top part 19, the center part 17, and the bottom part 21 are then joined by welding. For this purpose, the same welding robots 37 may be used that were used during the first partial joining step.

The second joining station 102 comprises for this purpose a stationary slip 63B for the center section 17 as well as a movable slip 63A for the top part 19 and a movable slip 63C for the bottom part 21. Furthermore, two handling robots 38 are provided in addition to the two welding robots 37. Both the welding robots 37 and the handling robots 38 may be arranged on a track 65 for robots which extends parallel to the longitudinal direction of the framework 3 to be produced. This way, the robots 37, 38 can reach every part 17, 19, 21 of the framework 3 to be welded.

The slips 63A, 63B, 63C serve to receive the prefabricated side parts 301, 303, 305 which workers can introduce and fasten in the side receiver by means of cranes. The slips 63A, 63B, 63C may furthermore comprise a ground-level base onto which one of the handling robots 38 first places the oil plates 28 and then the crossbars 11. Subsequently, these further framework components 28, 61A, 61B, 61C are tack-welded with the respective side parts 301, 303, 305 and/or submitted at least partially to penetration welding. The handling robot 38 removes the other framework components 28, 61A, 61B, 61C preferably from the parts magazines 59.

The movable slip 63A for the bottom part 21 comprises a lifting/tilting mechanism 71. The finished tacked/welded bottom part 21 is tilted by means of this lifting/tilting mechanism 71 in the context of the second partial joining step by lifting its end facing away from the center part 17. Then, the slip 63C of the bottom part 21 is moved toward the previously completely tacked/welded center part 17 and joined with it by welding, either tack-welding or partial penetration welding.

The movable slip 63A for the top part 19 comprises a lowering/tilting mechanism 69. The finished tacked/welded top part 19 is tilted in the context of the second partial step of the second joining step by lowering its end facing away from the center part 17. For this purpose, the pit 67 may be provided, if the slip 63B of the center part 17 is designed for the ground level. Then the slip 63A of the top part 19 is moved toward the finished tacked/welded center part 17 and joined with it by welding, either tack-welding or partial penetration welding. All welding work is performed by one of the welding robots 37.

d) Third Joining Step at the Third Joining Station 103

After first the prepositioned top, center, and bottom parts 19, 21, 17 have been joined in the second joining station 102 from side parts 301, 303, 305 and additional framework components 28, 61A, 61B, 61C provisionally connected through tack-welding, and then the top, bottom, and center parts 19, 21, 17 have been provisionally positioned, preferably by tack-welded connections, and joined to form the overall prepositioned framework structure 73, in a third joining step to be performed in the third joining station 103 this initially not yet load-bearing, prepositioned framework structure 73 is ultimately processed further to become the finished, load-bearing framework 3 in that its framework components 5, 61 are welded together by penetration welding.

FIGS. 12 to 14 show examples of a third joining station 103 to be used for this purpose from a top view, side view, and/or perspective view. For reasons of clarity, the welding robot 41 was left out in FIG. 13.

The third joining station 103 comprises a retention device 39 which is configured to suitably hold the entire already prepositioned framework structure 73 and, if necessary, to move it so that its prepositioned framework components that were only joined by tack-welding can be welded together by the welding robot 41 in a load-bearing manner.

The retention device 39 of the third joining station 103 may be configured, for example, to rotate the entire prepositioned framework structure 73 around a longitudinal axis of the same.

For this purpose, the retention device 39 may comprise a turning device 75, to which a component receiver 79 is mounted, which can be rotated around an axis of rotation 77 by means of a motor 81, for example by up to 90° or 180°, preferably by up to 360°.

To then weld the joined framework structure 73 prepositioned in the second joining step in the third joining step so that it becomes load-bearing, it is first fastened to the turning device 75. The prepositioned framework structure 73 that is not yet load-bearing may temporarily be supported by supports 83. Additionally, a supporting structure 85 provisionally applied to the prepositioned framework structure 73 may help support the framework structure 73 until it is welded together in the third joining step until it is sufficiently load-bearing.

As soon as the prepositioned framework structure 73 is fastened to the turning device 75 serving as the retention device 39 in this manner, it can rotate the entire prepositioned framework structure 73 around the axis of rotation 77.

Welding robots 41 that are arranged lateral to the turning device 75 and that can move along a movable track 87 parallel to the turning device 75 can then, after the prepositioned framework structure 73 has been suitably rotated around the axis of rotation 77, access with its welding heads 89 all boundary surfaces between adjacent framework components 5 of the framework structure 73 and join these in a load-bearing manner by applying continuous welding seams.

Using slightly different terms, the welding seams, most of which were initially only tack-welded, are submitted to penetration welding in the third joining step. The third joining station 103 provided for this purpose may comprise supports 83 for receiving the tacked framework structure 73. Turning devices 75 are arranged on both sides whose rotatable receivers 79 are preferably movable in the Z axis, which means that their height can be adjusted, so that the framework structure 73 can be lifted off the supports 83 and then rotated around the axis of rotation 77. The third joining station 103 is furthermore equipped with preferably two welding robots 41. A supporting structure 85 may be required which is installed at the end of the previously performed second joining step, for example after the tack-welding, and which can help stabilize the tacked, prepositioned framework structure 73 during the transport from the second joining station 102 to the third joining station 103. This supporting structure may remain on the framework structure 73 in the third joining station 103 as well until its welding seams are fully welded.

Then a few possible other features of embodiments of the invention are explained. Unless stated otherwise, these features can be implemented in all three joining stations 101, 102, 103.

In particular in the first and the second joining station 101, 102, a retention device 31, 35 provided there may be configured to passively hold the respective framework components 5 and/or side parts 301, 303, 305 in a stationary condition. The retention devices 31, 35 may be configured for example as simple, stationary tables that support the components to be held only from the bottom. If necessary, additional clamping devices may be provided to additionally protect the components against a lateral slippage.

Alternatively or additionally, in particular the retention devices 31, 35 of the first and second joining station 101, 102 may comprise at least a handling robot 313, 321, 38 which is configured to actively move the respective framework component 5 and/or side parts 301, 303, 305. Such a handling robot 313, 321, 38 may be provided for example with a gripping or retaining mechanism, by means of which it can grip and/or hold the framework components 5 and/or the side parts 301, 303, 305. This gripping or retaining mechanism may be relatively displaced from a base of the handling robot, for example by having been mounted to a movable and/or tiltable arm. Depending on the application, a displacement in one, two, or three spatial directions and/or an orientation in one, two, or three spatial angles is possible.

In particular the first and/or second joining station 101, 102 may additionally comprise a parts magazine 59 to store and provide parts for the framework components 5. A handling robot 313, 321, 38 may, in this case, be configured to remove components from the parts magazine 59 and to bring them directly to a predetermined position of the retention device 31, 35.

The welding robots 33, 37, 41 to be provided in the different joining stations 101, 102, 103 may be configured identically, but may also differ from each other depending on the application-specific requirements. The welding robots 33, 37, 41 may, in particular, comprise a welding head 310 for performing the welding and be configured to move the welding head 310 with at least three translational, preferably three translational and three rotational, degrees of freedom of movement.

In other words, a welding robot may, in particular, be configured to be able to move its welding head 310 translationally in three planes that are orthogonal to each other. Preferably, the welding head 310 should be capable of tilting rotationally by three axes orthogonal to each other. Such a welding robot may bring its welding head 310 to any position within a workspace and orientation in a space. Because of that, the welding robot may perform geometrically complex welding processes as well. Welding to be performed in difficult to access areas and/or geometrically complex, in particular, nonlinearly formed welding seams can be performed.

If applicable, however, a simply constructed welding robot may be used as well which can move a welding head for example only along one or two directions and/or which cannot tilt the welding head or only around one or two axes.

In a special design of the joining process, at least one welding robot may, during the second joining step, weld the framework components of the entire prepositioned framework structure together already in a load-bearing manner by continuous welding seams on the load-bearing framework. In other words, not only positioning welding may be performed in the second joining step such as tack-welding, but additionally, continuous and therefore load-bearing welding seams may be executed between framework components. The welding processes performed during the second and during the subsequent third joining steps should be coordinated in such a way that the second and third joining steps last approximately the same amount of time.

In other words, in the event that a prepositioned penetration welding in the third joining step of the previously only tack-welded prepositioned framework structure 73 in the second joining step would take significantly longer than the entire second joining step, then part of these penetration welding processes may be performed during the second joining step already so that both joining steps require approximately the same amount of time. A total cycle time within the production line 200 may be shortened in this manner.

In the context of a contract-specific production of supporting structures for passenger transport systems, the corresponding data sets from a CAD system could, for example, be provided to a production control system of the production assembly so that, for example, the handling robots of the different joining stations can gather the suitable parts or framework components from parts magazines and place them at predetermined positions so that the welding robots can always move to the correct positions.

It is conceivable as well that top flanges and bottom flanges are cut to size for a supporting structure at an adjacent workstation of the first joining station so that such contract-specific components are produced immediately before they are processed further in the first joining station.

What is conceivable as well is production without any static devices such as tables, for example, in that one or more handling robots hold all parts or framework components to be joined until a welding robot has welded these to a framework piece produced previously.

In summary, what is described herein is an assembly 100 as well as a production 200 or respectively a method to be performed by it for producing a supporting structure 1 for a passenger transport system such as a moving staircase, which comprises a sequential arrangement of semi- or fully automatic joining stations 101, 102, 103, which cooperate with each other regarding a sequential order of joining steps. Each of the joining stations 101, 102, 103 comprises components and machines in the form of at least one retention device 31, 35, 39 and at least one welding robot 33, 37, 41 as well as optionally at least one handling robot 38, 313, 321. The joining stations 101, 102, 103 are configured regarding the components and machines used therein in such a way that interim products can be efficiently produced by means of the respective joining steps and harmonized with a subsequent joining station so that the interim products can be sequentially forwarded from joining station to joining station with optimized short cycle times to be able to provide, at the end of the sequence, a finished, load-bearing supporting structure 1.

The production assembly and/or production line presented herein as well as the production method preferably to be performed with it may offer various technical as well as economic advantages over the conventional production of supporting structures of passenger transport systems. The proposed production method may, for example, significantly decrease production time and therefore increase a production rate per workspace needed. Furthermore, the quality of welding seams holding the supporting structure together is generally higher when using automation and welding robots than when using conventional manual welding. Furthermore, the proposed method or the use of the proposed production assembly requires less production personnel and in particular fewer highly qualified production personnel such as certified welders. Finally, the proposed production method significantly reduces the warping in the produced supporting structure, because when two welding robots are used, a welding process may be started for example at both ends of the framework and then continued to the middle of the framework, making the heat input symmetrical. Overall, a production of supporting structures of passenger transport systems can be performed at a higher quality and with lower costs.

Finally, it should be pointed out that terms such as "comprising," etc., do not exclude other elements or steps and terms, just as "one" or "a" do not exclude a plurality. It should furthermore be pointed out that features or steps that were described with reference to one of the exemplary embodiments above may also be used in combination with other features or steps of other exemplary embodiments described above. Reference numbers in the claims are not to be considered a limitation.

The invention claimed is:

1. A method for producing a supporting structure for a passenger transport system, wherein the supporting structure comprises a framework with a bottom part, a center part, and a top part made from joined load-bearing framework components, the method comprising:
   a first joining step at a first joining station comprising
      retaining framework components at a retention device, and
      welding together the framework components with side parts of the bottom part, side parts of the center part, and side parts of the top part of the framework using at least one welding robot;
   transferring the side parts of the bottom part, the side parts of the center part, and the side parts of the top part produced in the first joining step to a second joining station; and
   a second joining step at a second joining station comprising a positioning welding together of two further framework components by producing tacked welding connections with the adjacently arranged side parts of the bottom part, the center part, or the top part.

2. The method in accordance with claim 1, wherein the second joining step further comprises:
   retaining the side parts of the bottom part, the side parts of the center part, and the side parts of the top part at the at least one retention device,
   retaining the further framework components adjacently arranged between the side parts of the bottom part, the center part, and the top part at the at least one retention device,
   the positioning welding together of the further framework components by generating tack-welded connections with the adjacently arranged side parts of the bottom part, the center part, or the top part to form a prepositioned bottom part, a prepositioned center part, or a prepositioned top part using at least one welding robot of the second joining station, and
   a positioning welding together of the prepositioned bottom part and the prepositioned top part by generating tack-welded connections at the opposite ends of the prepositioned center part to form a prepositioned framework structure using the at least one welding robot.

3. The method according to claim 2, whereby a third joining step is sequentially performed at a third joining station in a semi- or fully automated manner, the third joining step comprising:
   retaining the prepositioned framework structure at a retention device, and
   a load-bearing welding together of the framework components of the prepositioned framework structure by generating continuous welding connections to the load-bearing framework using at least one welding robot of the third joining station.

4. The method according to claim 3, wherein the second joining step further comprises:
   retaining the side parts of the top part and retaining further framework components adjacently arranged between the side parts of the top part at a first parts retention device,
   retaining the side parts of the center part and a retention of further framework components adjacently arranged between the side parts of the center part at a second parts retention device, retaining the side parts of the bottom part and retention of further framework components adjacently arranged between the side parts of the bottom part at a third parts retention device, and moving two parts retention devices of the three parts retention devices each relative to a parts retention device of the three parts retention devices.

5. The method according to claim 4, wherein the prepositioned bottom part or the prepositioned top part is tilted relative to the prepositioned center part using the first or the third parts retention device respectively.

6. The method according to claim 3, wherein in the third joining step the entire prepositioned framework structure is rotated using the retention device of the third joining station about a longitudinal axis of the entire prepositioned framework structure.

7. The method according to claim 3, wherein respective framework components or side parts are passively held stationary by the respective retention device during at least one of the first and the second joining steps.

8. The method according to claim 3, wherein respective framework components or side parts are actively moved during at least one of the first and the second joining steps by at least one handling robot.

9. The method according to claim 8, wherein during at least one of the first and the second joining steps, parts for the framework components are stored and provided in a parts magazine, and wherein the handling robot removes the parts from the parts magazine and brings the parts to a predeterminable position at the respective retention device.

10. The method according to claim 3, wherein the first joining step comprises:
an active handling and bringing into position of respective framework components of the bottom part or the top part at a first retention device using a handling robot associated with the first retention device,
a retaining of the respective framework components of the bottom part or the top part at one of the two first retention devices, and a welding together of the framework components of the bottom part or the top part, each with two side parts of the bottom part and two side parts of the top part of the framework, each by a welding robot assigned to each of the first retention devices,
an active handling and bringing into position respective framework components of the center part at a second retention device by a handling robot associated with the second retention device,
a retaining of the respective framework components of the center part at the second retention device, and
a welding together of the framework components of the center part with two side parts of the center part of the framework using two welding robots associated with the second retention device.

11. The method according to claim 3, wherein during the second joining step, a load-bearing welding together of the framework components of the entire prepositioned framework structure occurs by creating continuous welding connections with the load-bearing framework using at least one welding robot, wherein the scope of the welding performed during the second and the third joining steps is coordinated in such a way that the second and the third joining steps take approximately the same time.

12. The method according to claim 3 further comprising a prejoining step comprising:
a retention of base material components and accessory components to be mounted to them by means of at least one retention device, and
a welding together of the base material components and the accessory components to be mounted to them to form framework components using at least one welding robot.

13. The method according to claim 12, wherein the base material components and the accessory components to be mounted to them are jointly turned around an axis of rotation during the prejoining step.

* * * * *